(12) United States Patent
Bercovitz et al.

(10) Patent No.: US 12,388,850 B1
(45) Date of Patent: Aug. 12, 2025

(54) CYBERSECURITY ROOT CAUSE ANALYSIS USING COMPUTING RESOURCE NAME CORRELATION

(71) Applicant: Wiz, Inc., New York, NY (US)

(72) Inventors: Barak Bercovitz, Even-Yehuda (IL); Bernie Pinkenzon-Howard, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/982,355

(22) Filed: Dec. 16, 2024

(51) Int. Cl.
*H04L 9/40* (2022.01)

(52) U.S. Cl.
CPC .............................. *H04L 63/1416* (2013.01)

(58) Field of Classification Search
None
See application file for complete search history.

(56) References Cited

U.S. PATENT DOCUMENTS

| | | | |
|---|---|---|---|
| 8,893,212 | B2 | 11/2014 | Reisman |
| 10,389,738 | B2 | 8/2019 | Muddu et al. |
| 10,693,743 | B2 | 6/2020 | Zhong et al. |
| 11,177,999 | B2 | 11/2021 | Stern et al. |
| 11,216,265 | B1 | 1/2022 | Hornbeck |
| 11,973,784 | B1 | 4/2024 | Erlingsson et al. |
| 11,991,198 | B1 | 5/2024 | Kapoor et al. |
| 12,034,754 | B2 | 7/2024 | O'Hearn et al. |
| 12,216,527 | B1 * | 2/2025 | Starosta .............. G06F 11/0751 |
| 2018/0309772 | A1 * | 10/2018 | Song .................... H04L 63/101 |
| 2020/0076835 | A1 * | 3/2020 | Ladnai ................ H04L 63/0263 |
| 2020/0134487 | A1 * | 4/2020 | Kim ........................ G06N 20/00 |
| 2022/0311794 | A1 | 9/2022 | Maya et al. |
| 2023/0009127 | A1 | 1/2023 | Boyer |
| 2023/0075355 | A1 | 3/2023 | Twigg et al. |
| 2023/0169170 | A1 * | 6/2023 | Yaron .................... G06F 21/577 726/1 |
| 2023/0275917 | A1 | 8/2023 | Karmali et al. |
| 2024/0022600 | A1 * | 1/2024 | Zhang .................... G06N 20/10 |
| 2024/0080329 | A1 | 3/2024 | Reed et al. |
| 2025/0047687 | A1 * | 2/2025 | Duan .................. H04L 61/4511 |

FOREIGN PATENT DOCUMENTS

| EP | 4036772 A1 * | 8/2022 | ........... G06F 21/577 |
|---|---|---|---|
| WO | WO-2023232794 A1 * | 12/2023 | ........... G06F 21/552 |

* cited by examiner

*Primary Examiner* — Joseph P Hirl
*Assistant Examiner* — Hassan Saadoun
(74) *Attorney, Agent, or Firm* — M&B IP Analysts, LLC

(57) ABSTRACT

A system and method for cybersecurity root cause analysis. A method includes parsing a first string into at least one first structured unit based on predetermined structured unit formats. The first string is indicated in cybersecurity data related to a cybersecurity event. Each predetermined structured unit format is defined with respect to at least one substring each having a respective data type. Each first structured unit is compared to a corresponding second structured unit of at least one second structured unit of a second string. Each second structured unit is a portion of text of the second string identified by parsing the second string based on the predetermined structured unit formats. The first string is correlated to the second string based on the comparison. A resource corresponding to the second string is identified. A root cause of the cybersecurity event is determined based on the identified resource.

18 Claims, 4 Drawing Sheets

CYBERSECURITY ROOT CAUSE ANALYSIS USING COMPUTING RESOURCE NAME CORRELATION

TECHNICAL FIELD

The present disclosure relates generally to root cause analysis, and more specifically to root cause analysis based on computing resources.

BACKGROUND

With the ever-evolving digital transformation businesses, the software development lifecycle has become a notable component of many successful businesses. While the increased amount of software being utilized promises great improvements in how services are delivered, software development remains a persistent challenge. In particular, due to development velocity rapidly increasing, software is being created and deployed faster than ever, and software infrastructure must often be expanded rapidly to accommodate. As more software is created, ways to identify and address problems resulting from software development issues and, more specifically, automated tools to aid in mitigating cyber threats, are becoming increasingly desirable.

Additionally, due to the large amount of software being created and the significant investments in delivery automation powered by DevOps, complex continuous integration/continuous delivery (CI/CD) pipelines that use on-premises or cloud-native technologies to build, deploy, and control the entire application stack have been adopted. These pipelines can control everything from infrastructure to business logic, and the interactions between resources in the software environment can no longer be effectively managed manually by human operators alone. As a result of these issues, security teams in companies are seeing increased business risk and employee burnout. Further, companies face challenges in effectively mitigating risks once security vulnerabilities have been introduced via newly created flawed software.

Solutions for improving or otherwise enabling new forms of root cause analysis are therefore desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for cybersecurity root cause analysis. The method comprises: parsing a first string into at least one first structured unit based on a plurality of predetermined structured unit formats, wherein the first string is indicated in cybersecurity data related to a cybersecurity event, wherein each first structured unit is a portion of text of the first string, wherein each predetermined structured unit format is defined with respect to at least one substring each having a respective data type; comparing each of the at least one first structured unit to a corresponding second structured unit of at least one second structured unit of a second string, wherein each second structured unit is a portion of text of the second string identified by parsing the second string based on the plurality of predetermined structured unit formats; correlating the first string to the second string based on the comparison; identifying a resource corresponding to the second string; and determining a root cause of the cybersecurity event based on the identified resource.

Certain embodiments disclosed herein also include a non-transitory computer-readable medium having stored thereon causing a processing circuitry to execute a process, the process comprising: parsing a first string into at least one first structured unit based on a plurality of predetermined structured unit formats, wherein the first string is indicated in cybersecurity data related to a cybersecurity event, wherein each first structured unit is a portion of text of the first string, wherein each predetermined structured unit format is defined with respect to at least one substring each having a respective data type; comparing each of the at least one first structured unit to a corresponding second structured unit of at least one second structured unit of a second string, wherein each second structured unit is a portion of text of the second string identified by parsing the second string based on the plurality of predetermined structured unit formats; correlating the first string to the second string based on the comparison; identifying a resource corresponding to the second string; and determining a root cause of the cybersecurity event based on the identified resource.

Certain embodiments disclosed herein also include a system for cybersecurity root cause analysis. The system comprises: a processing circuitry; and a memory, the memory containing instructions that, when executed by the processing circuitry, configure the system to: parse a first string into at least one first structured unit based on a plurality of predetermined structured unit formats, wherein the first string is indicated in cybersecurity data related to a cybersecurity event, wherein each first structured unit is a portion of text of the first string, wherein each predetermined structured unit format is defined with respect to at least one substring each having a respective data type; compare each of the at least one first structured unit to a corresponding second structured unit of at least one second structured unit of a second string, wherein each second structured unit is a portion of text of the second string identified by parsing the second string based on the plurality of predetermined structured unit formats; correlate the first string to the second string based on the comparison; identify a resource corresponding to the second string; and determine a root cause of the cybersecurity event based on the identified resource.

Certain embodiments disclosed herein include a method, non-transitory computer-readable medium, or system as noted above or below, further including or being configured to perform the following step or steps: performing at least one mitigation action with respect to the cybersecurity event based on the determined root cause.

Certain embodiments disclosed herein include a method, non-transitory computer-readable medium, or system as noted above or below, wherein the determined root cause is the identified resource, wherein the at least one mitigation action includes quarantining the identified resource.

Certain embodiments disclosed herein include a method, non-transitory computer-readable medium, or system as noted above or below, further including or being configured to perform the following step or steps: identifying a role of each of the at least one first structured unit, wherein the corresponding second structure unit for each first structured unit is determined based on the role of the first structured unit.

Certain embodiments disclosed herein include a method, non-transitory computer-readable medium, or system as noted above or below, wherein each role is identified based on a structure of text within one of the at least one first structure unit.

Certain embodiments disclosed herein include a method, non-transitory computer-readable medium, or system as noted above or below, further including or being configured to perform the following step or steps: normalizing at least a subset of the at least one first structured unit based on the role identified for each first structured unit.

Certain embodiments disclosed herein include a method, non-transitory computer-readable medium, or system as noted above or below, further including or being configured to perform the following step or steps: modifying text of each first structured unit in the at least a subset of the at least one first structured unit.

Certain embodiments disclosed herein include a method, non-transitory computer-readable medium, or system as noted above or below, further including or being configured to perform the following step or steps: generating an aggregated comparison score between the first string and the second string based on the comparison between each first structured unit and the corresponding second structured unit, wherein the first string is correlated to the second string based on the aggregated comparison score.

Certain embodiments disclosed herein include a method, non-transitory computer-readable medium, or system as noted above or below, further including or being configured to perform the following step or steps: matching text between each first structured unit and the corresponding second structured unit.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
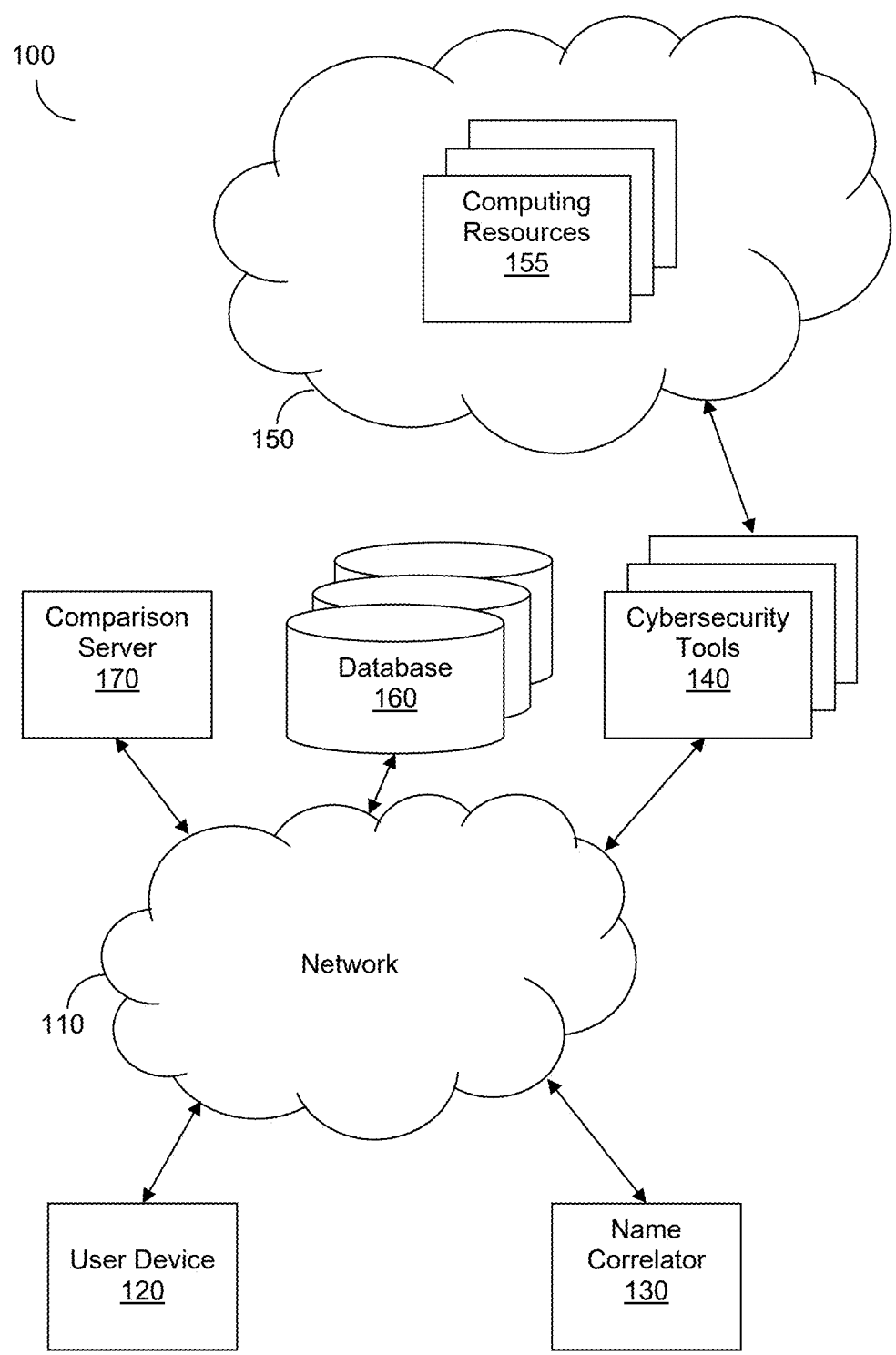
FIG. 1 is a network diagram utilized to describe various disclosed embodiments.

The various disclosed embodiments include methods and systems for name correlation as well as techniques for using name correlation results for purposes such as root cause analysis in order to aid in mitigating cyber threats.

The disclosed embodiments provide various techniques for correlating names in a more complex and granular manner using unit-based name structuring and correlation which utilizes unit-based comparisons in order to realize name correlation which accounts for potential differences in, for example, naming conventions used by individuals assigning names, how names are expressed in different programming languages or other code conventions, differences between computer-generated or otherwise computer-assigned names and manually created names, and the like.

In an embodiment, name correlation is performed by breaking up strings of different names into structured units. More specifically, the strings may be parsed in order to identify units within each string. Any or all of the units are normalized into normalized formats using normalization rules defining predetermined normalized formats and corresponding criteria for structured units belonging to respective normalized formats. After any normalization, names may be compared unit-by-unit. Based on the unit-by-unit analysis, strings including the respective units are matched to each other. Names corresponding to the matched strings are correlated to each other.

In at least some embodiments, the correlated names may be utilized to mitigate or otherwise remediate cyber threats or vulnerabilities. To this end, a first name of the correlated names may be a name of a resource indicated in an alert or other cybersecurity data. A second name of a resource deployed in a computing environment which was correlated to the first name may be utilized to identify the resource deployed in the computing environment as the root cause of the cyber threat. The cyber threat may be mitigated or otherwise remediated based on the identified root cause.

As a non-limiting example, a resource may be listed as "prod_us-east-3_John" in a location in storage indicating deployment of the resource, while a Terraform file referencing the resource may indicate a name of the resource as "${ENV}_${ABCLTD_REGION}_John." Although the resource name is represented differently, these names represent the same underlying resource. In accordance with various disclosed embodiments, the names may be broken down into units such as "us-east-3" for the first name, and "${ABCLTD_REGION}" for the second name. Units of the first name may be normalized into normalized units such as "region in ABC Ltd." The normalized unit string "region in ABC Ltd." From the first name may be compared to the corresponding unit "${ABCLTD_REGION}" in the second name using natural language processing which may yield a similarity above a threshold (e.g., a threshold score of 0.8 on a scale from 0 to 1). Thus, these units may be matched in a manner which would not have yielded a match if the strings were compared directly (e.g., comparing the string including "us-east-3" to the string including "${ABCLTD_REGION}").

In this regard, it has been identified that the same resource may have different names in different places within code or otherwise within computing environments. As a non-limiting example, a resource represented in source code of a cybersecurity alert may have one name in the source code, and may have another name in a location where the resource is deployed. These names may have minor variations from each other due to formatting or choices made while naming, which might result in names failing to match when performing a direct string comparison. For example, some solutions might utilize Regular Expression (RegEx) comparisons in order to match strings, but these RegEx comparisons may fail due to differences in naming conventions or other substantively minor variations in names.

The disclosed embodiments, which utilize a unit-based comparison realized by defining rules in a manner which allows for applying natural language processing to aid in comparisons, therefore allows for correlating names in a more sophisticated manner which accounts for contents of the names. Consequently, various disclosed embodiments may allow for correlating names with a lower number of false negatives, false positives, or both, as compared to more naïve approaches such as RegEx matching or other comparisons of entire strings.

Moreover, various disclosed embodiments allow for providing a tool-agnostic process which may be used to match strings representing the same resource regardless of which formats or naming conventions are used by the tools used to create the data indicating the resource names.

FIG. 1 shows an example network diagram 100 utilized to describe the various disclosed embodiments. In the example network diagram 100, a user device 120, a name correlator 130, a set of cybersecurity tools 140, a set of databases 160, and a comparison server 170 communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The user device 120 may be, but is not limited to, a personal computer, a laptop, a tablet computer, a smartphone, a wearable computing device, or any other device capable of receiving and displaying notifications. The user device 120 may be owned, operated, or otherwise used by a software developer or other user of a computing environment such as a computing environment 150 in which computing resources 155 are deployed. Root cause analysis determined as discussed herein may be sent to the user device 120 and used to manage potential cyber threats or otherwise manage posture within such a computing environment.

The name correlator 130 is configured to correlate names in order to perform root cause analysis as discussed herein. More specifically, the name correlator 130 may be configured to correlate names of computing resources such as, but not limited to, the computing resources 155 of the computing environment 150, in order to identify root causes of cybersecurity events with respect to the computing resources 155.

The cybersecurity tools 140 may be configured to monitor activity within the computing environment 150 in order to detect cybersecurity events or otherwise to detect potential cyber threats and to report on such monitoring (e.g., to the user device 120). In accordance with various disclosed embodiments, such reporting may include alerts or other data indicating names or other strings associated with resources among the computing resources 155 which are involved in or otherwise related to detected cybersecurity events.

As discussed herein, such alerts or other security findings may indicate a resource, but the relationship between that resource and underlying code may be unclear. For example, user may name resources using custom-defined names which may be arbitrary and may vary from user-to-user, between different providers, and the like. The result is that the same resource may be represented with different names. In accordance with various disclosed embodiments, the name correlator 130 is configured to correlate names based on normalized structured unit versions of names in order to determine which resource names are effectively the same and therefore likely represent the same underlying resource.

The databases 160 may store files or other data used to deploy resources among the computing resources 155. Such files indicate names or other identifiers of resources among the computing resources 155. As discussed herein, these names among files stored in the databases 160 may be compared to other resource names such as names indicated in cybersecurity data from the cybersecurity tools 140 in order to correlate between names.

The comparison server 170 is configured to perform comparisons and, in particular, comparisons between text. In some embodiments, pairs of units to be compared the comparison server 170 are sent by the name correlator 130 in order to cause the comparison server 170 to compare between the pairs of units and to return a score indicating a degree of matching between the units of each pair of units. It should be noted that the comparison server 170 is depicted as a separate system from the name correlator 130 for example purposes, but that in at least some embodiments, the name correlator 130 may also be configured to perform text comparisons between pairs of units rather than sending pairs of units to an external server.

It should be noted that FIG. 1 depicts an implementation of various disclosed embodiments, but that at least some disclosed embodiments are not necessarily limited as such. Other deployments, arrangements, combinations, and the like, may be equally utilized without departing from the scope of the disclosure.

Figure 2:
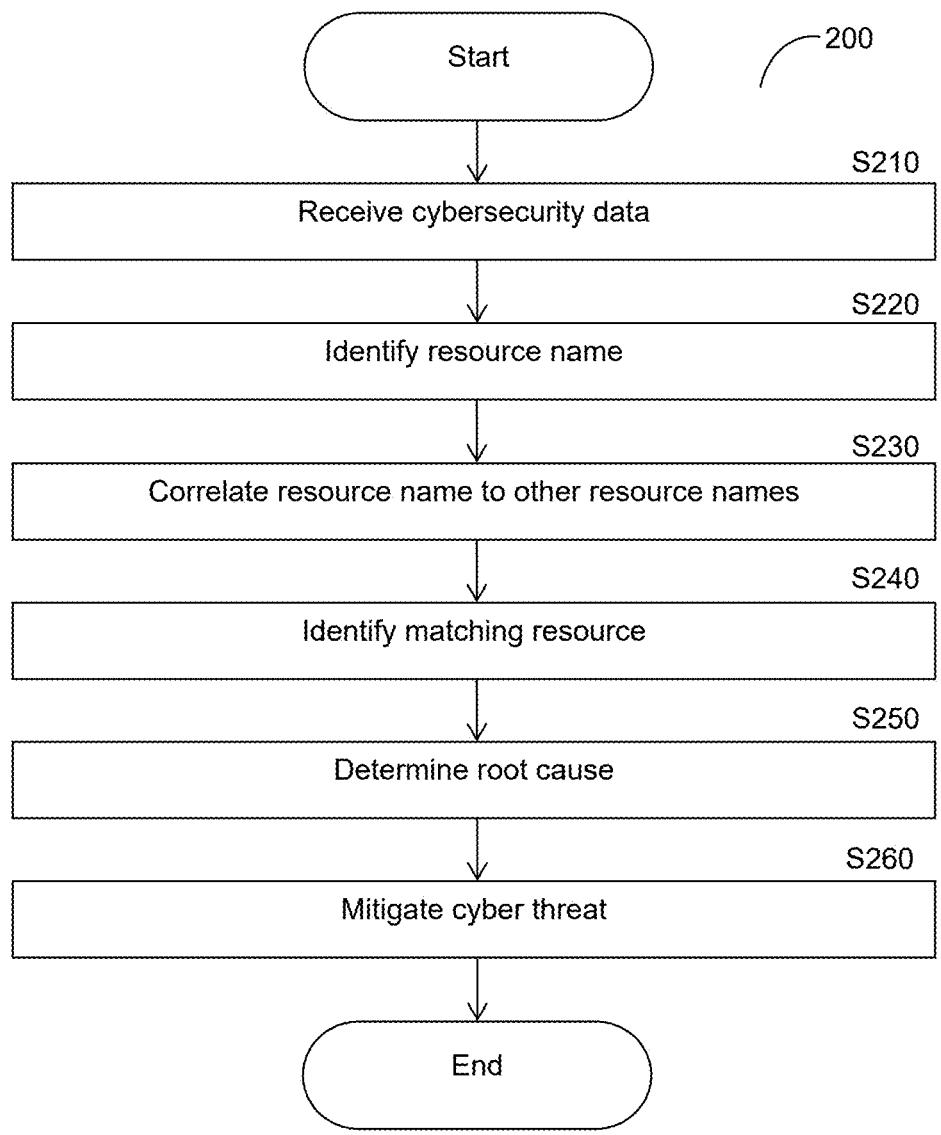
FIG. 2 is a flowchart illustrating a method for root cause analysis using name correlation according to an embodiment.

FIG. 2 is a flowchart 200 illustrating a method for root cause analysis using name correlation according to an embodiment. In an embodiment, the method is performed by the name correlator 130, FIG. 1.

At S210, cybersecurity data is received. The cybersecurity data may be or may include, but is not limited to, alerts, event data, or other data indicating cybersecurity threats detected within a computing environment. In accordance with various disclosed embodiments, at least some of the cybersecurity data indicates names or other identifiers of resources involved in cybersecurity events. A resource involved in a cybersecurity event may be, but is not limited to, a resource which was accessed without authorization, a resource which has been hijacked, a resource which accepts commands or other data from unauthorized entities, and the like. As noted above, the connection between these resources and the code used to create and configure these resources may be unclear. This lack of clear connection therefore increases the challenge in determining the root cause for any cybersecurity issues related to a given resource.

The resource may be, but is not limited to, a physical server, a virtual server, a data storage, a networking component (e.g., a load balancer, a content-delivery network, etc.), a software development tool, a software component (e.g., a software container, a virtual machine, etc.), a combination thereof, and the like.

At S220, a resource name or other resource identifier is identified in the cybersecurity data or otherwise within data indicating a name of a resource. In accordance with various disclosed embodiments, the name or other identifier is or includes textual content describing the identity of the resource. To this end, in a further embodiment, such a name or other identifier is or includes a string. Such a string may be analyzed and broken down into structured units as discussed further below in order to facilitate comparing these strings in order to determine which names or identifiers are effectively the same despite differences in substrings or other differences in text.

At S230, the identified resource name is correlated to names of other resources. More specifically, in an embodiment, the resource name is correlated to names of resources deployed in one or more computing environments (e.g., the computing environment 150, FIG. 1). That is, the resource name indicated in the cybersecurity data or other data indicating an identifier of a resource is correlated to names or other identifiers of resources deployed in a computing environment. Accordingly, such correlation may allow for determining which resource deployed in the computing environment corresponds to the resource represented in the cybersecurity data or other data.

At S240, a matching resource is identified based on the correlation. More specifically, the matching resource has a name corresponding to a string which was correlated to the string of the resource name identified at S220. That is, the matching resource has a name which matches the name of the resource identified at S220 as determined based on the correlation. As discussed herein, the correlation is based on comparison of units defined based on structures of text of substrings or other portions of strings. Accordingly, the matching resource may be determined despite differences in content or formatting of different instances of the name of the resource (e.g., instances of the resource name from different sources of data).

At S250, a root cause is determined based on the matching resource. The determined root cause may be, but is not limited to, the matching resource, a set of code defining the matching resource (e.g., a code file including the name of the matching resource), and the like.

At S260, one or more remedial actions are performed in order to mitigate a cybersecurity threat based on the determined root cause. Mitigating the cybersecurity threat may include, but is not limited to, quarantining one or more resources (e.g., a resource determined as the root cause), changing a configuration (e.g., changing a configuration of a software or network component), updating software associated with a resource (e.g., obtaining and deploying an updated version of software used by or used to deploy the resource), generating and sending a notification prompting a fix for the (e.g., to an owner of the root cause resource), combinations thereof, and the like.

Figure 3:
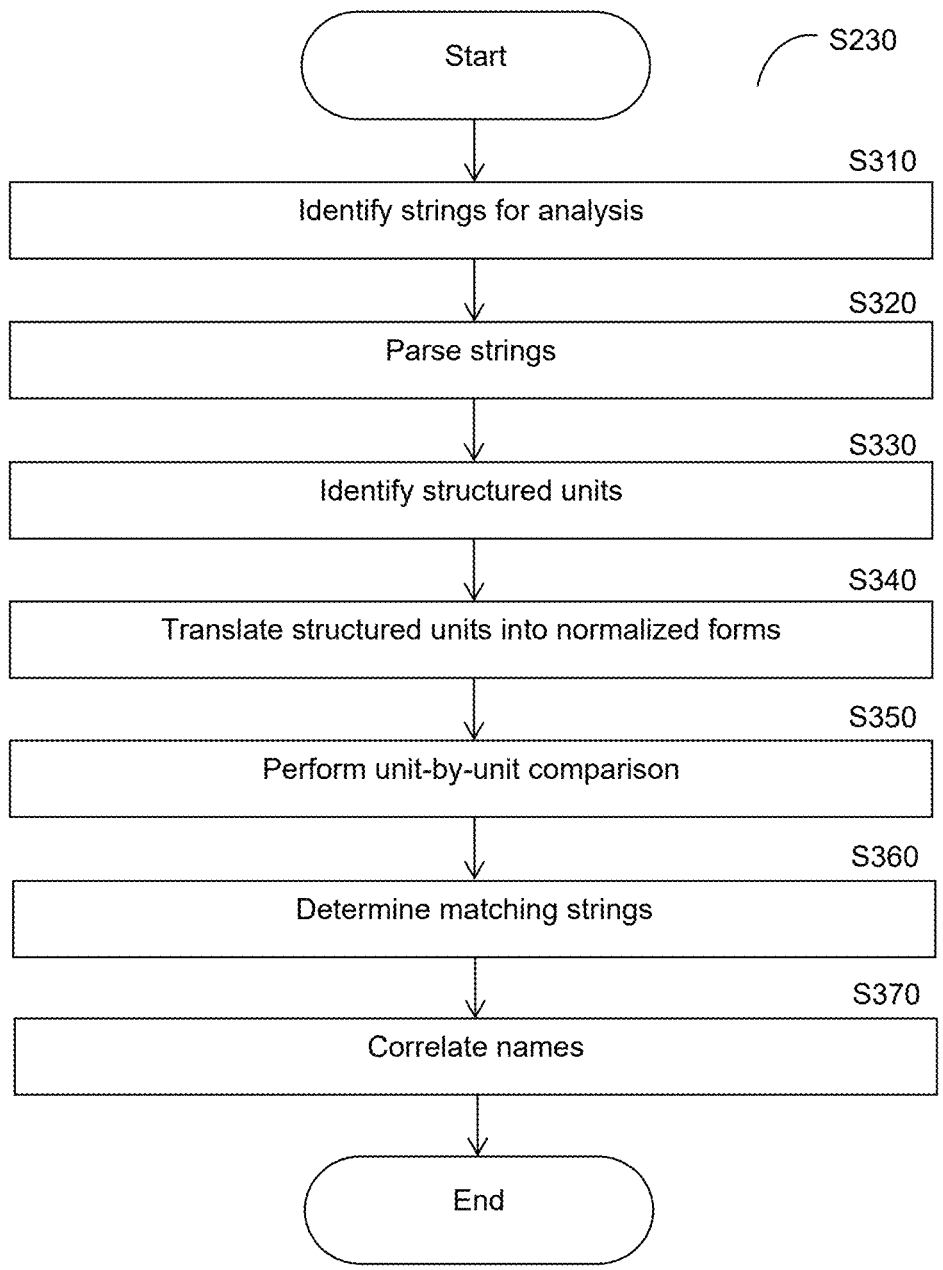
FIG. 3 is a flowchart illustrating a method for name correlation according to an embodiment.

FIG. 3 is a flowchart S230 illustrating a method for name correlation according to an embodiment.

At S310, strings are identified for analysis. The strings are or include strings of a resource name to be correlated with other resources as well as the names of the other resources. In an embodiment, the identified strings include a first string and one or more second strings, where the first string is to be compared to each of the second strings as discussed below in order to, for example, correlate the first string to one of the second strings. To this end, in an example implementation, the first string corresponds to a name or other identifier of a resource indicated in cybersecurity data, and each of the second strings corresponds to a known name or other identifier of a respective resource deployed in the computing environment.

As discussed herein, matching the first string to one of the second strings may allow for determining that the first string and the matching second string represent the same underlying resource despite any differences in formatting or naming conventions. That is, similarities between normalized units may be utilized to determine which names are effectively the same even though they may appear very different and a direct string comparison would result in enough of a difference that the strings may be identified as non-matching even when the strings represent the same underlying resource.

At S320, the strings are parsed. More specifically, each string is parsed into one or more units identified according to respective structured units. In this regard, these structured units effectively act as building blocks of a given name, where each name is made up of one or more of these building blocks (i.e., the structured units). In an embodiment, parsing the strings includes identifying text in one or more structured unit formats within each string.

In an embodiment, parsing the strings includes applying a set of string parsing rules defined with respect to a set of structured unit definitions. The structured unit definitions may be predetermined or otherwise known formats of text associated with known structured units. In a further embodiment, the string parsing rules define such structured unit definitions at least with respect to data types and a number of portions of data of each data type. In yet a further embodiment, the string parsing rules define such structured unit definitions further with respect to order or other organization of portions of data having different data types.

Accordingly, the structured unit definitions may be defined with respect to data types (e.g., string types), certain predetermined data values, formats, combinations thereof, and the like. To this end, the structured unit identification rules may include a set of structured unit definitions defined based on the data types, values, formats, and the like. As a non-limiting example, a structured unit definition may be defined as a structured unit including a set of substrings each having a respective data type organized in a certain order. Each structured unit definition may correspond to a respective role. In some embodiments, the structured unit identification rules may be further defined with respect to predetermined separator characters in order to further improve accuracy of structured unit identification.

Table 1 shows various non-limiting examples of structured unit definitions and their corresponding roles:

TABLE 1

| Role | Structured Unit Definition |
| --- | --- |
| Raw (Uncategorized) Text | Raw(String) |
| Abbreviation Text | Abbrev(String) |
| Universally Unique Identifier | UUID(String) |
| Email Address | Email(String, String) |
| Internet Protocol Address | IPv4 (u8, u8, u8, u8) |
| Version Name | Version (u16, u16, u16) |
| Hashing Algorithm Result | HashingAlgorithm(String) |
| Code File Name | CodeFile(Name, Name, Name) |
| Geographic Region of Computing Service Provider | SPRegion(String, String, String) |
| Resource Identifier of Computing Service Provider | SPResourceID(SPResource) |
| Account Identifier of Computing Service Provider | SPAccountID(String) |
| Resource Name of Computing Service Provider | SPResourceName (Composite<Separator, List<Name>>) |
| Container Registry Identifier | ContainerRegistry (ContainerRegistryURI) |
| Function Defined in Code | Function(Code) |
| Hardware Component Identifier | HardwareComponent (Separator, Manufacturer<Name>) |

In at least some embodiments, multiple versions of each kind of role may be stored as different roles, with each version having its own role identifier and a corresponding structured unit definition. The structured unit definitions may vary between different versions of roles. As a non-limiting example, any of the roles whose role identifier includes "Computing Service Provider" shown in Table 1 above may have different versions corresponding to different service providers (e.g., different companies), where the structured unit definition for the version of each service provider corresponds to a form used by that service provider. This may allow for further distinguishing between the same kind of role (e.g., geographic location) for different organizations or other entities who may use different formats, values, organizational schemes, and the like, as portions of their resource names.

At S330, structured units are identified based on the parsed strings. The structured units are portions of a name or otherwise portions of the strings having the structured unit definitions identified at S320. In an embodiment, S330 further includes identifying a role of each structured unit. When the structured unit definitions are defined in a table in which each structured unit definition is associated with a respective role, the identified role may be the role corresponding to a matching structured unit definition for a given portion of text.

At S340, at least some of the units may be translated into normalized forms. In an embodiment, translating the units into normalized forms includes applying a set of normalization rules corresponding to units having respective roles. To this end, the set of normalization rules may include, but are not limited to, rules for modifying text of units in order to normalize the units. Such rules for modifying text may include, but are not limited to, rules for replacing text, rules for adding text (e.g., adding text corresponding to a role such as "region" for a unit having a role of a region of a given computing services provider).

In some embodiments, the normalization rules may be defined with respect to a normalization table or other data indicating normalized versions of units or portions thereof. Such a normalization table may define various structures of text or otherwise define the various roles in association with corresponding normalized forms such as, but not limited to, normalized formats, normalized text, and the like. That is, for each role having a certain text structure which may belong to a given unit, a corresponding normalized text or a corresponding structure for the normalized text is stored in the normalization table. When the corresponding normalized form is normalized text, normalizing the unit may include replacing at least a portion of the unit with the normalized text. When the corresponding normalized form is a normalized format, normalizing the unit may include modifying at least a portion of the text of the unit in order to comply with the normalized format.

At S350, a unit-by-unit comparison is performed by comparing the structured units between strings (e.g., comparing the structured units of one string to the structured units of another string) for various pairs of strings among the parsed strings. More specifically, substrings or other text of units which correspond to the same role within the respective string. That is, a role of each unit identified in a given string may be determined, and units having the same role are compared between strings.

In an embodiment, the role of each unit is determined at least based on text of the unit. In a further embodiment, the role of each unit may be determined further based on an organization of the unit within the string (e.g., a position in order of the unit within the string with respect to an order defined based on units in the string). That is, in an embodiment, for each pair of strings being compared, each unit in a first string of the pair is compared to a corresponding unit in a second string of the pair, and the units which are compared are units having the same role.

To this end, in a further embodiment, the unit-by-unit comparison includes determining a role for each unit among the strings to be compared. In yet a further embodiment, the roles of units may be defined in the unit identification rules used for the parsing. As a non-limiting example, the unit identification rules may define predetermined roles associated with respective unit types such that any unit parsed and identified as matching a given unit type is determined to have the role associated with that unit type. As noted above, the unit types may be defined with respect to text structure, and each unit type may correspond to a respective structure of a substring or other text of a unit.

In an embodiment, performing the unit-by-unit comparison includes comparing text between units having the same roles from different strings (e.g., two strings of a pair of strings being compared) in order to generate a set of comparison results. In another embodiment, performing the unit-by-unit comparison includes transmitting pairs of units having the same roles to be compared to an external system in order to obtain a set of comparison results. The result of the unit-by-unit comparison may be or may include a set of distances, a set of unit comparison scores, or both. Each unit comparison score may represent a degree of matching between units which were compared.

At S360, matching strings are determined based on the unit-by-unit comparison. In an embodiment, S360 includes generating an aggregated name comparison score for each compared pair of strings based on the set of comparison results and comparing each aggregated name comparison score to a predetermined threshold (e.g., 0.8). In a further embodiment, the strings of each pair of strings which have an aggregated name comparison score above the predetermined threshold are determined to be matching.

In an embodiment, the aggregated name comparison score is generated by determining an average of the comparison scores for units compared between each pair of strings being compared. In some embodiments, the aggregated name comparison score may be generated using a weighted aggregation, for example by applying a weight to each unit comparison score in order to generate a respective weighted comparison score and summing the weighted comparison scores for each compared pair of strings in order to determine the aggregated name comparison score.

At S370, names are correlated based on the matching strings. In an embodiment, correlating the names includes associating a name represented by a first string among each pair of matching strings with the name represented by a second string of the pair of matching strings. The associations between the strings representing the correlated names may be stored for subsequent use.

As a non-limiting example, a first string indicated in cybersecurity data may be "prod_us-east-3_John." Multiple second strings corresponding to respective resources deployed in computing environment in files used to deploy computing resources in the computing environment (e.g., Terraform files). In this example, one of the second strings is indicated in the deployment files is "${ENV}-${ABCLTD_REGION}_John."

In this example, the first string is parsed into units "prod," "us-east-3," and "John" according to structured unit definitions. The unit t "us-east-3" is normalized to "region in ABC Ltd." The second string is parsed into units "${ENV}," "${ABCLTD_REGION}," and "John." The unit "${ENV}" is normalized to "environment" and the unit "John" is normalized to "username."

According to this example, the normalized unit "production environment" is compared to the normalized unit "environment" because both of these units have a software development pipeline role. Likewise, the normalized unit "region in ABC Ltd" in the second position of its string is compared to the unit "${ABCLTD_REGION}" because both of these units have a geographic location role. Also, the units "John" and "John" are compared because they both have a "name" role. In a further example, the comparisons include comparing text and generating scores indicating a similarity between text of the compared units. An aggregated name comparison score is generated based on the scores for the compared units. In this example, the aggregated name comparison score is 0.81 which is above a matching threshold of 0.8, resulting in a match between the first and second strings.

Notably, the match according to the previous example can be performed despite differences in numbers of potential separator characters such as underscore ("_") or hyphen ("-"). In this regard, it is noted that a more naïve comparison might compare the text directly or might compare portions of text divided via separators. As another non-limiting example, some solutions might consider a first string "prod_us-east-3_John" to be composed of 4 substrings "prod," "us," "east," "3," and "John" based on identifying the underscores and hyphens as separators. Likewise, some solutions might consider a second string "John_${REGION}_${App}" to be composed of 3 substrings "John," "${REGION}," and "${App}" based on identifying the underscores and slashes as separators. Comparing the strings directly would yield a low match score, and comparing the substrings would also likely result in a mismatch at least because of the differences in organization and number of substrings.

Various disclosed embodiments, which parse strings into units defined based on unit structure and not only based on separator characters or other text representing separations between substrings, allow for more accurately identifying units for comparison compared to techniques which only utilize separator text. Additionally, by comparing units as described herein on a unit-by-unit basis with respect to roles (e.g., comparing a unit representing a region in ABC Ltd. to another unit representing a region in ABC Ltd.) rather than only based on order in the string in accordance with at least some disclosed embodiments allows for identifying matching strings even when their respective portions are organized differently.

More specifically, using roles defined with respect to structure of text within substrings and not only with respect to structure of text between substrings allows for more accurately identifying units to be compared, which in turn allows for more accurately determining matching strings despite potential differences in content or formatting. As noted above, differences in formatting in strings may cause failure to match strings representing the same underlying entity. The disclosed embodiments allow for avoiding such false negatives by accounting for composition of strings in a more nuanced manner.

Figure 4:
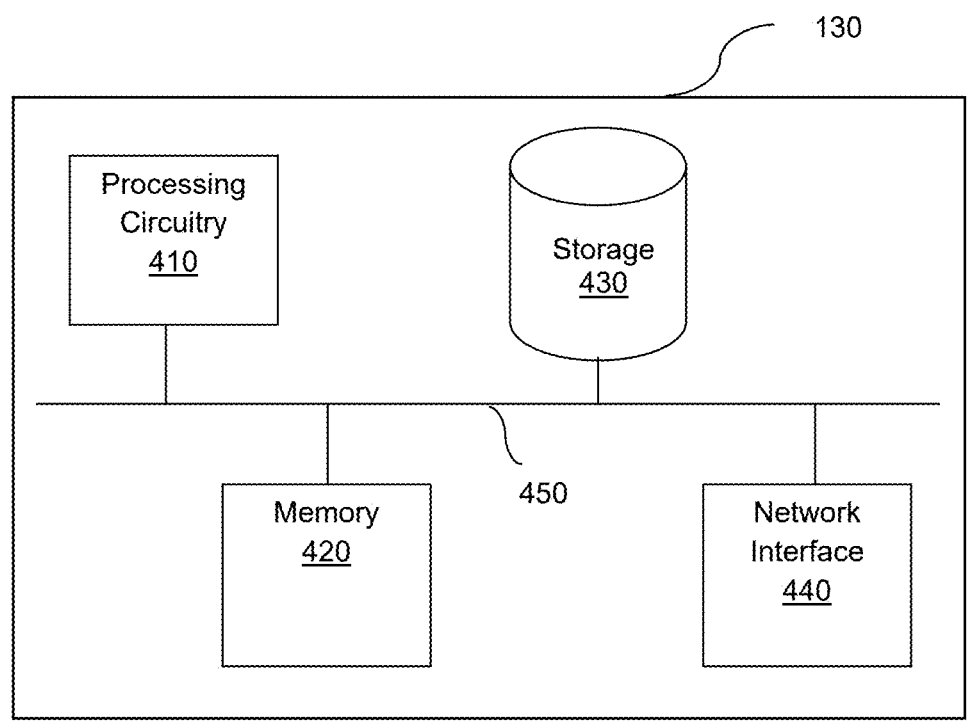
FIG. 4 is a schematic diagram of a name correlator according to an embodiment.

FIG. 4 is an example schematic diagram of a name correlator 130 according to an embodiment. The name correlator 130 includes a processing circuitry 410 coupled to a memory 420, a storage 430, and a network interface 440. In an embodiment, the components of the system 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the name correlator 130 to communicate with other systems, devices, components, applications, or other hardware or software components, for example as described herein.

It should be understood that the embodiments described herein are not limited to the specific architecture illustrated in FIG. 4, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for cybersecurity root cause analysis, comprising: parsing a first string into at least one first structured unit based on a plurality of predetermined structured unit formats, wherein the first string is indicated in cybersecurity data related to a cybersecurity event, wherein each first structured unit is a portion of text of the first string, wherein each predetermined structured unit format is defined with respect to at least one substring each having a respective data type; identifying a role of each of the at least one first structured unit; comparing each of the at least one first structured unit to a corresponding second structured unit of at least one second structured unit of a second string, wherein each second structured unit is a portion of text of the second string identified by parsing the second string based on the plurality of predetermined structured unit formats, wherein the corresponding second structured unit for each first structured unit is determined based on the role of the first structured unit: correlating the first string to the second string based on the comparison; identifying a resource corresponding to the second string; and determining a root cause of the cybersecurity event based on the identified resource.

2. The method of claim 1, further comprising: performing at least one mitigation action with respect to the cybersecurity event based on the determined root cause.

3. The method of claim 2, wherein the determined root cause is the identified resource, wherein the at least one mitigation action includes quarantining the identified resource.

4. The method of claim 1 wherein each role is identified based on a structure of text within one of the at least one first structure unit.

5. The method of claim 1, further comprising: normalizing at least a subset of the at least one first structured unit based on the role identified for each first structured unit.

6. The method of claim 5, wherein normalizing the at least a subset of the at least one first structured unit further comprises: modifying text of each first structured unit in the at least a subset of the at least one first structured unit.

7. The method of claim 1, wherein comparing each of the at least one first structured unit to the corresponding second structured unit further comprises: matching text between each first structured unit and the corresponding second structured unit.

8. A non-transitory computer-readable medium having stored thereon instructions for causing a processing circuitry to execute a process, the process comprising: parsing a first string into at least one first structured unit based on a plurality of predetermined structured unit formats, wherein the first string is indicated in cybersecurity data related to a cybersecurity event, wherein each first structured unit is a portion of text of the first string, wherein each predetermined structured unit format is defined with respect to at least one substring each having a respective data type; identifying a role of each of the at least one first structured unit; comparing each of the at least one first structured unit to a corresponding second structured unit of at least one second structured unit of a second string, wherein each second structured unit is a portion of text of the second string identified by parsing the second string based on the plurality of predetermined structured unit formats, wherein the corresponding second structured unit for each first structured unit is determined based on the role of the first structured unit; correlating the first string to the second string based on the comparison; identifying a resource corresponding to the second string; and determining a root cause of the cybersecurity event based on the identified resource.

9. A system for cybersecurity root cause analysis, comprising: a processing circuitry; and a memory, the memory containing instructions that, when executed by the processing circuitry, configure the system to: parse a first string into at least one first structured unit based on a plurality of predetermined structured unit formats, wherein the first string is indicated in cybersecurity data related to a cybersecurity event, wherein each first structured unit is a portion of text of the first string, wherein each predetermined structured unit format is defined with respect to at least one substring each having a respective data type; identify a role of each of the at least one first structured unit; compare each of the at least one first structured unit to a corresponding second structured unit of at least one second structured unit of a second string, wherein each second structured unit is a portion of text of the second string identified by parsing the second string based on the plurality of predetermined structured unit formats, wherein the corresponding second structured unit for each first structured unit is determined based on the role of the first structured unit; correlate the first string to the second string based on the comparison; identify a resource corresponding to the second string; and determine a root cause of the cybersecurity event based on the identified resource.

10. The system of claim 9, further comprising: perform at least one mitigation action with respect to the cybersecurity event based on the determined root cause.

11. The system of claim 10, wherein the determined root cause is the identified resource, wherein the at least one mitigation action includes quarantining the identified resource.

12. The system of claim 9 wherein each role is identified based on a structure of text within one of the at least one first structure unit.

13. The system of claim 9 wherein the system is further configured to: normalize at least a subset of the at least one first structured unit based on the role identified for each first structured unit.

14. The system of claim 13, wherein the system is further configured to: modify text of each first structured unit in the at least a subset of the at least one first structured unit.

15. The system of claim 9, wherein the system is further configured to: match text between each first structured unit and the corresponding second structured unit.

16. A method for cybersecurity root cause analysis, comprising: parsing a first string into at least one first structured unit based on a plurality of predetermined structured unit formats, wherein the first string is indicated in cybersecurity data related to a cybersecurity event, wherein each first structured unit is a portion of text of the first string, wherein each predetermined structured unit format is defined with respect to at least one substring each having a respective data type; comparing each of the at least one first structured unit to a corresponding second structured unit of at least one second structured unit of a second string, wherein each second structured unit is a portion of text of the second string identified by parsing the second string based on the plurality of predetermined structured unit formats; generating an aggregated comparison score between the first string and the second string based on the comparison between each first structured unit and the corresponding second structured unit; correlating the first string to the second string based on the comparison, wherein the first string is correlated to the second string based on the aggregated comparison score; identifying a resource corresponding to the second string; and determining a root cause of the cybersecurity event based on the identified resource.

17. A non-transitory computer-readable medium having stored thereon instructions for causing a processing circuitry to execute a process, the process comprising: parsing a first string into at least one first structured unit based on a plurality of predetermined structured unit formats, wherein the first string is indicated in cybersecurity data related to a cybersecurity event, wherein each first structured unit is a portion of text of the first string, wherein each predetermined structured unit format is defined with respect to at least one substring each having a respective data type; comparing each of the at least one first structured unit to a corresponding second structured unit of at least one second structured unit of a second string, wherein each second structured unit is a portion of text of the second string identified by parsing the second string based on the plurality of predetermined structured unit formats; generating an aggregated comparison score between the first string and the second string based on the comparison between each first structured unit and the corresponding second structured unit; correlating the first string to the second string based on the comparison, wherein the first string is correlated to the second string based on the aggregated comparison score; identifying a resource corresponding to the second string; and determining a root cause of the cybersecurity event based on the identified resource.

18. A system for cybersecurity root cause analysis, comprising: a processing circuitry; and a memory, the memory containing instructions that, when executed by the processing circuitry, configure the system to: parse a first string into at least one first structured unit based on a plurality of predetermined structured unit formats, wherein the first string is indicated in cybersecurity data related to a cybersecurity event, wherein each first structured unit is a portion of text of the first string, wherein each predetermined structured unit format is defined with respect to at least one substring each having a respective data type; compare each of the at least one first structured unit to a corresponding second structured unit of at least one second structured unit of a second string, wherein each second structured unit is a portion of text of the second string identified by parsing the second string based on the plurality of predetermined structured unit formats; generate an aggregated comparison score between the first string and the second string based on the comparison between each first structured unit and the corresponding second structured unit; correlate the first string to the second string based on the comparison, wherein the first string is correlated to the second string based on the aggregated comparison score; identify a resource corresponding to the second string; and determine a root cause of the cybersecurity event based on the identified resource.

\* \* \* \* \*